Jan. 3, 1967  K. S. ARVANITAKIS  3,295,689
APPARATUS FOR PURIFYING LIQUIDS
Filed Dec. 20, 1963  3 Sheets-Sheet 1
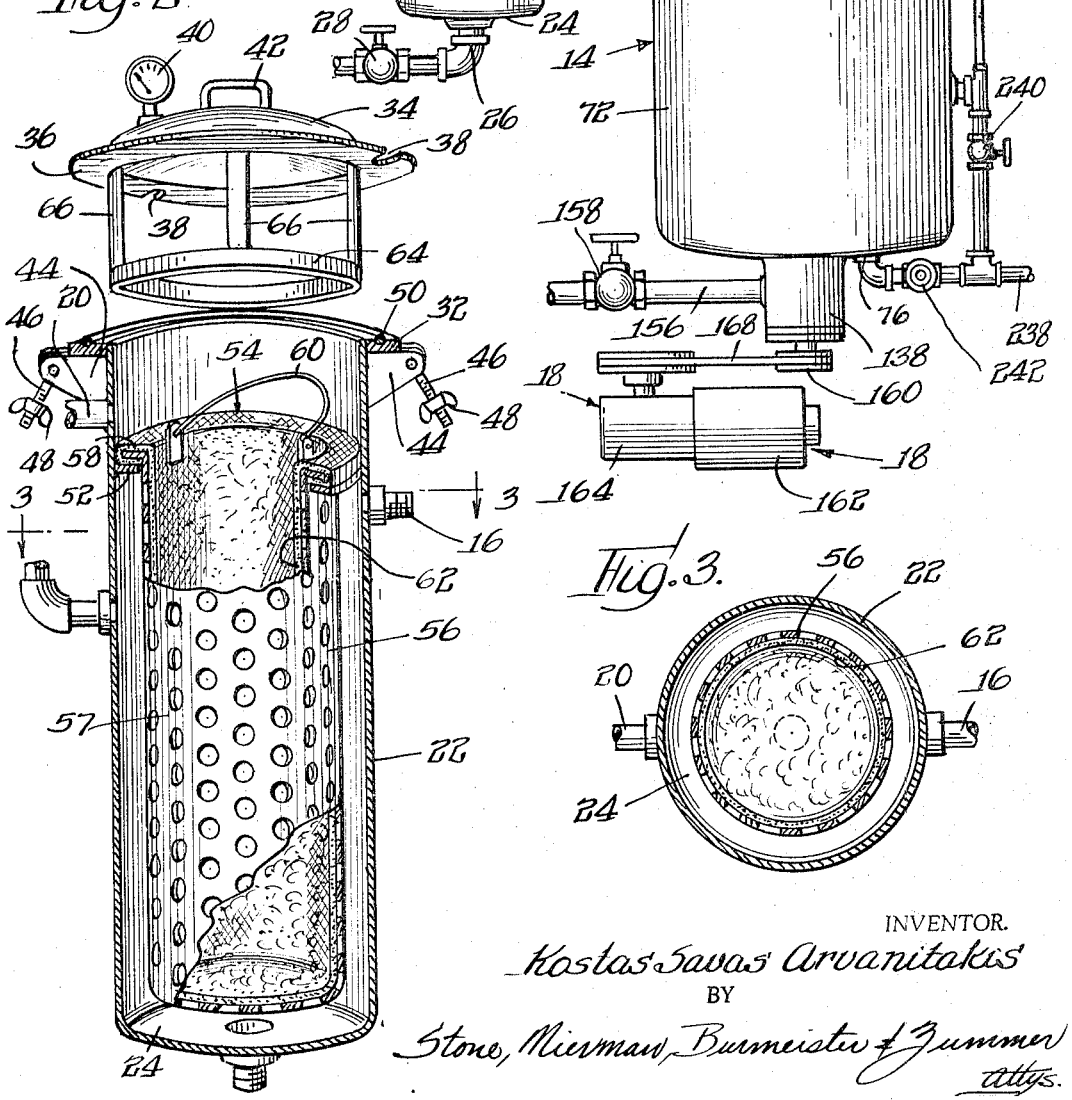
INVENTOR.
Kostas Savas Arvanitakis
BY
Stone, Nierman, Burmeister & Zummer
attys.

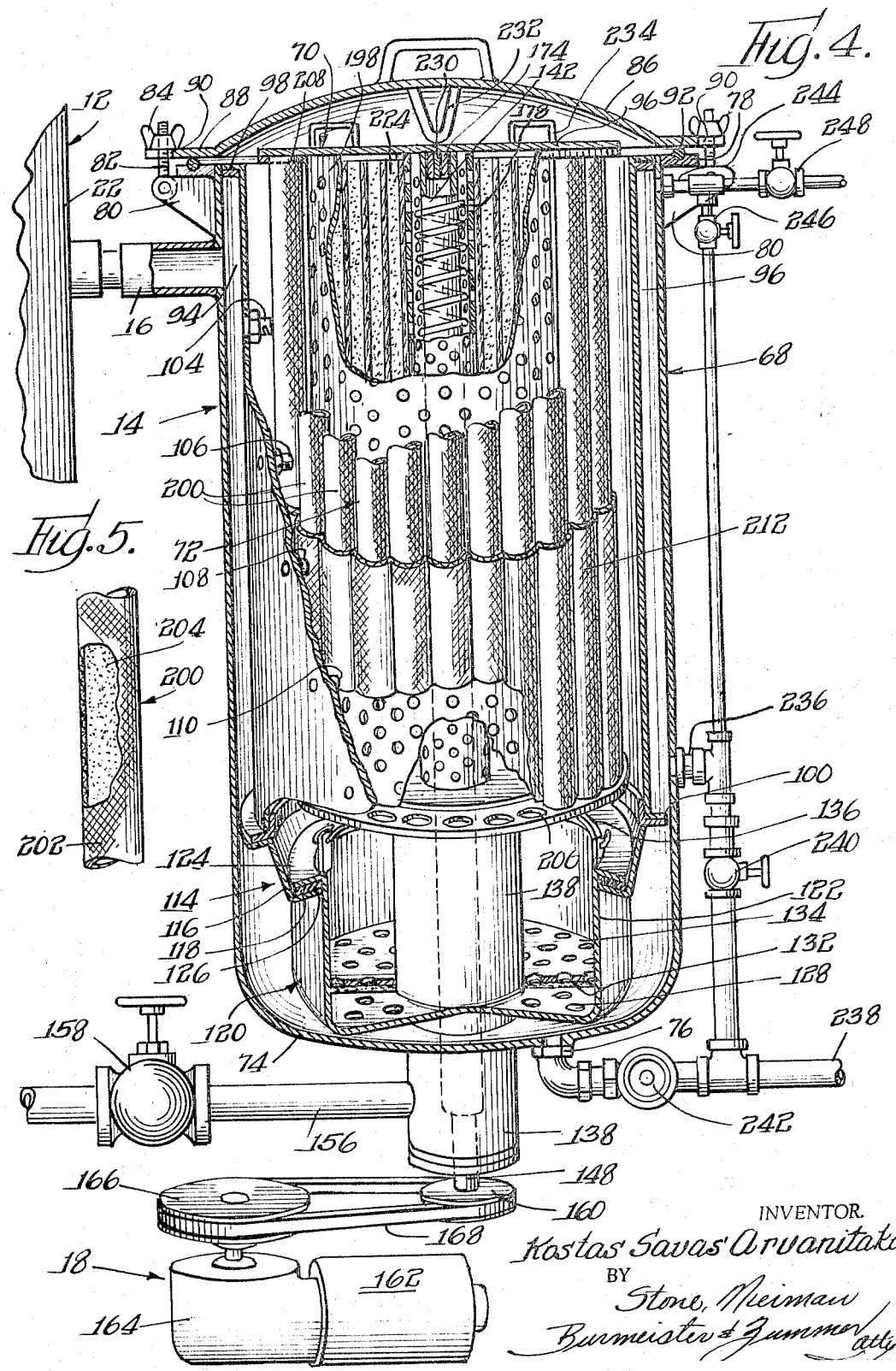

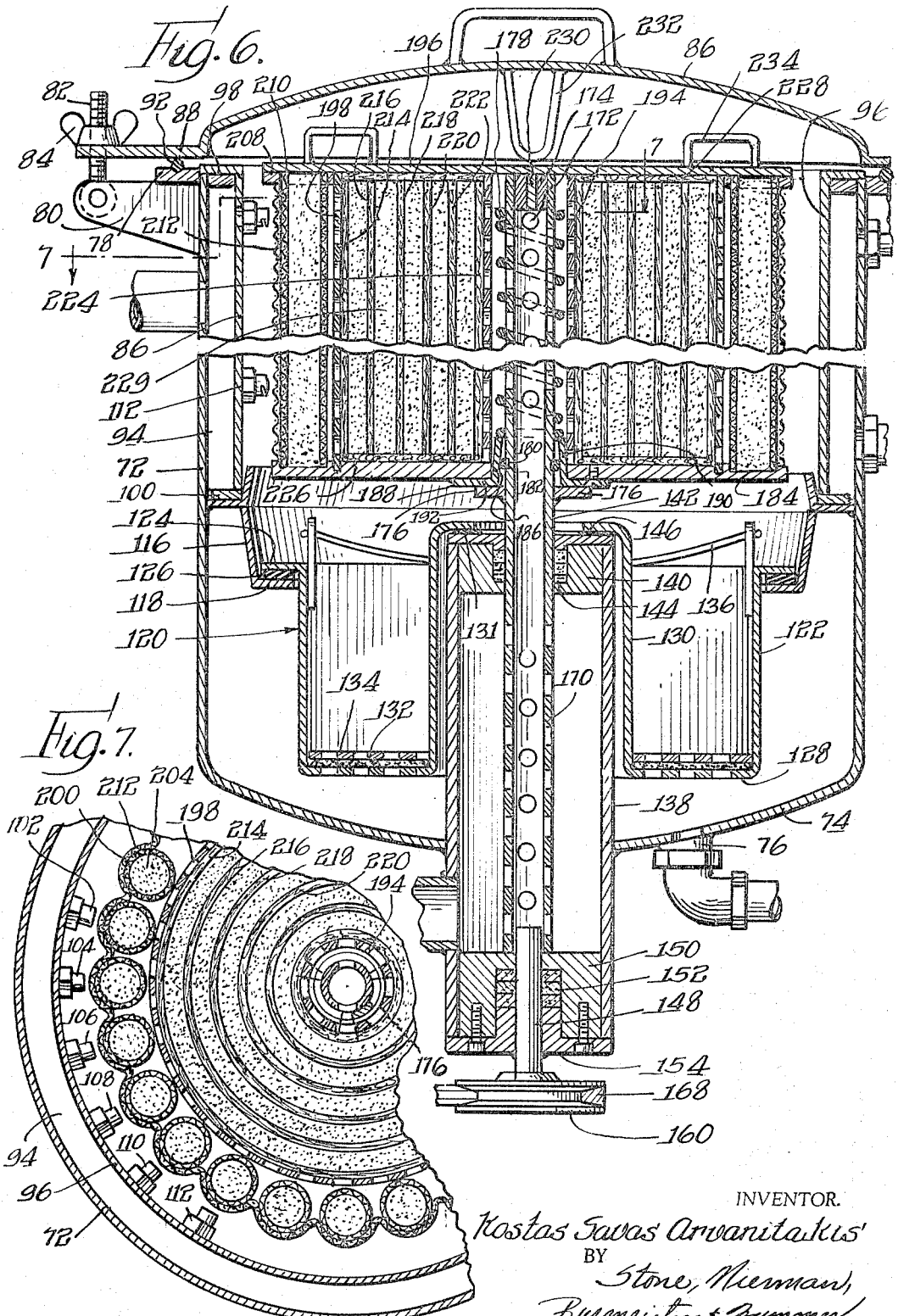

United States Patent Office 3,295,689
Patented Jan. 3, 1967

3,295,689
APPARATUS FOR PURIFYING LIQUIDS
Kostas Savas Arvanitakis, 10025 W. Grand Ave.,
Franklin Park, Ill. 60131
Filed Dec. 20, 1963, Ser. No. 332,139
4 Claims. (Cl. 210—259)

This invention relates to an apparatus and method for purifying liquids, and more particularly to an apparatus and method for purifying a dry cleaning solevnt after the solvent has been used to clean clothing.

Dry cleaning is a widely accepted process for cleaning clothes, especially woolen clothes, which are subject to shrinking upon contact with water. The most common solvent used in the dry cleaning of clothes is perchlorethylene. In as much as a dry cleaning solvent, such as perchlorethylene, is expensive, it becomes readily apparent that some method and apparatus must be provided to purify the solvent, that is, rejuvenate it by removing from the dry cleaning solvent the impurities which it collects during the dry cleaning process. Various and sundry methods and devices are provided for purifying a dry cleaning solvent; however, the principal objection to present devices and methods which purify a dry cleaning solvent is that life of a purifier is short and the efficiency of purification varies considerably during the life of the purifier. It is widely accepted that the lint in the dry cleaning solvent must be removed as well as the dirt particles and organic substances which the dry cleaning solvent removes from soiled clothing. The common method of purification is to filter the solvent to remove particles and then to remove dissolved impurities, such as, organic compositions by means of activated charcoal, which is an adsorbent material. A common problem which occurs with present devices which use an activated charcoal filter is that the outer periphery of the container for the activated charcoal becomes clogged with dirt and lint so that the filter becomes inactive and must be discarded although there is substantial life left in the activated charcoal. It should also be noted that in many instances, channels are formed through the activated charcoal so that a portion of the activated charcoal is not utilized at all. It is one of the principal objects of the instant invention to provide an improved apparatus for purifying a liquid, such as, dry cleaning solvent, which apparatus has an extended life for the filter cartridge.

It is another object of the herein-disclosed to provide a method for purifying dry cleaning solvent, which method maintains the effectiveness of a dry cleaning solvent purification filter.

It is a further object of this invention to provide an improved cartridge construction which allows the cartridge to utilize the optimum effciency of an adsorbent material in the cartridge.

It is a still further object of the present invention to provide an improved adsorbent composition.

Other objects and uses of the instant invention will become readily apparent to those skilled in the art upon a perusal of the following specification in light of the accompanying drawings in which:

FIGURE 1 is a side elevation of a liquid purification apparatus embodying the present invention;

FIGURE 2 is a partial cross-sectional and partial exploded view of a lint trap which is a part of the apparatus shown in FIGURE 1;

FIGURE 3 is a cross-sectional view taken on line 3—3 of FIGURE 2;

FIGURE 4 is an enlarged view of a cartridge container and cartridge which is a part of the apparatus shown in FIGURE 1, with portions of the cartridge container and cartridge broken away to show better the construction thereof;

FIGURE 5 is a fragmentary view of one of the tubes which constitutes a portion of the cartridge shown in FIGURE 4;

FIGURE 6 is a cross-sectional view of the upper and lower portions of the cartridge and container shown in FIGURE 4, but with central portion not shown; and FIGURE 7 is a cross-sectional view taken on line 7—7 of FIGURE 6, showing a portion of the cartridge and cartridge container.

Referring now to the drawings and especially to FIGURE 1., a purification apparatus, generally indicated by numeral 10, is shown therein, which apparatus embodies the present invention. The purification apparatus 10 generally consists of a delinter 12, a filter 14 which is connected to the delinter by a pipe 16, and a drive 18 which is connected to filter 14.

The delinter 12 is connected to a dry cleaning machine (which is not shown) by a conventional pipe 20 and the flow of liquid is controlled to the delinter by a valve 21. The delinter includes a tank 22 which has a bottom 24 which is connected to a drain pipe 26. A valve 28 is connected to the drain pipe to regulate the drain flow out of the delinter. A pressure gage 30 is mounted in the side wall of tank 22. The tank has a sealing flange 32 at its upper end upon which rests a delinter top 34. The delinter top 34 includes a sealing flange 36, which sealing flange 36 has a pair of lock notches 38 in its outer periphery. A pressure gage 40 is mounted on the top 34 and a handle 42 is fixed to the top for convenient manipulation of the top. The tank 22 has a pair of locking ears 44 fixed thereto with a pair of locking studs 46 pivotedly mounted on the ears. A wing nut 48 is threadedly mounted on each of the studs 46. The studs 46 may be selectively positioned in the notches 38 so that the wing nuts may be tightened into engagement with sealing flange 36 to seal closed the tank 22. An O-ring 50 is positioned between the flanges 36 and 32 to provide the sealing means therebetween.

The delinter 12 contains a means for trapping and holding lint within the tank. Positioned within the tank 22 is a mounting flange 52 upon which rests a lint trap 54. The lint trap includes a metallic cylindrical basket 56 which has cylindrical perforated side wall 57. The basket has an annular flange 58 formed integral with the side wall for supporting the basket on the mounting flange 52. A handle 60 is connected to the side wall to provide a convenient means for lifting the basket out of tank 22. Positioned within the basket 56 is a nylon bag 62 which is made of a 32 mesh material for trapping particles having a size greater than five thousandths of an inch. The nylon bag is positioned over, around, and under flange 58 to hold the bag in position. A locking ring 64 is connected to the top 34 by a plurality of posts 66, and the locking ring 64 engages the bag 62 which is positioned over the flange 58 to hold the bag in position and to hold the basket onto the mounting flange 52. As is evident from FIGURE 2, the inlet to tank 22, that is, pipe 20, is above the mounting flange 52 and the outlet to the tank, which is connected to pipe 16, is below the mounting flange so that all liquid which passes through the delinter must pass through the bag 62 before it enters the filter 14.

The filter 14 generally includes a cartridge container 68 with a cartridge 70 rotatably mounted therein. The cartridge container includes a cartridge tank 72 which is connected to the pipe 16, and the tank has a bottom 74 which is connected to a drain 76. The cartridge tank has a sealing flange 78 fixed to its upper end, and a pair of mounting ears 80 are fixed to the tank below flange 78. A stud 82 is pivotedly connected to each of the ears 80 and a wing nut 84 is threadedly mounted on each of the studs. A cartridge tank top 86 is sealingly mounted on the cartridge tank 72 to provide a sealing cover for the filter. The cartridge tank top includes a sealing flange 88 which has a pair of notches 90 in its outer periphery to receive studs 82. To provide a seal for the tank, an O-ring 92 is positioned between the sealing flange 78 and the sealing flange 88. It may be appreciated that when the studs 82 are positioned in their respective notches 90, the wing nuts 84 may be tightened into engagement with sealing flange 88 to compress the O-ring 92 and form a seal between the two flanges thereby sealing closed the tank.

An interior tank 94 is formed in the cartridge tank 72 by an interior tank wall 96 which has an upper annular flange 98 in engagement with the interior of tank 72 and a lower annular flange 100 also in sealing engagement with the interior of tank 72. Nozzles 102, 104, 106, 108, 110, 112 are mounted in the wall 96 to provide a means for spraying solvent out of the interior tank toward the cartridge. As may be seen in FIGURE 4 and 7, the nozzles are spaced vertically and angularly from each other in order to define a line along the interior of wall 96, which line generally conforms to a helix.

Positioned below the interior tank 94 is a dirt trap 114 for collecting dirt particles which wall off the outer surface of the cartridge. The dirt trap includes a conical dirt deflector 116 which is fixed to flange 100. The dirt deflector includes a basket flange 118 which supports a dirt basket 120. As may be clearly seen in FIGURE 6, the basket 120 has a side 122 which has a support flange 124 formed integral therewith. The support flange is supported by the basket flange 118, and a gasket 126 is positioned between the flange 118 and the flange 124 to seal the space between the flanges. The basket has an annular perforated bottom 128 which bottom has a cylindrical column 130 in the central portion thereof with an annular flange 131 formed integral therewith. An annular felt filter pad 132 is positioned in engagement with the bottom 128 and a perforated filter holder 134 is mounted on top of the filter 132 to hold the filter pad in place. The basket 120 includes a conventional handle 136 which is connected to the side wall 122 to provide a convenient means for lifting the basket out of the tank.

The cartridge tank has a collector sleeve 138 welded into its bottom 74 as may be best seen in FIGURE 6. The sleeve has an upper bearing plug 140 sealingly fixed in its upper end. An elongated hollow cartridge shaft 142, which extends from the bottom of the sleeve to a point adjacent to top 86 and supports the cartridge, is rotatably mounted in the bearing plug 140. Packing 144 is positioned in the bearing plug 140 in sealing engagement with shaft 142. A packing plate 146 is secured to the plug and is held in engagement with the packing to maintain a seal between the plug and the packing. A drive shaft 148 is fixed to the lower end of shaft 142, and the drive shaft also seals that end for reasons which will become apparent hereinafter. A lower bearing plug 150 is sealingly fixed inside the lower end of collector sleeve 138. The bearing plug 150 rotatably supports the shaft 142 and has the drive shaft 148 rotatably mounted therein. Packing 152 is mounted within the lower bearing plug, and a packing plate 154 is secured to the bearing to compress the packing and to maintain a seal between the lower plug and the drive shaft. The collector 138 is connected to the aforementioned dry cleaning machine through pipe 156 which has a valve 158 in the line.

The shaft 142 is drivingly connected to the drive 18 so that the shaft and cartridge are rotated thereby. A sheave 160 is fixed to the lower end of drive shaft 148. The drive 18 includes a variable speed electric motor 162 which is mounted on a conventional frame (which frame is not shown). A speed reducer 164 is drivingly connected to the electric motor 162 and has a sheave 166 drivingly connected to it. The sheave 166 is connected to sheave 160 by means of a drive belt 168 so that the electric motor rotates the cartridge at a selected speed.

The cartridge shaft 142 provides a means for supporting the cartridge 70 and for conducting liquid from the interior of the cartridge to the collector sleeve 138. Shaft 142 has a plurality of discharge apertures 170 in its lower portion for discharging a liquid into the collector sleeve, which discharge apertures may be best seen in FIGURE 6. In its upper portion, the shaft 142 has a plurality of inlet apertures 172 extending along the length of a substantial portion of the cartridge shaft to allow a liquid to enter the shaft and flow down the inside of the shaft. A drive plug 174, which is fixed to the upper end of the shaft, provides a means for drivingly connecting the cartridge to the shaft and the cartridge is supported upon a cartridge rest, which consists of three identical plates 176 which plates are welded to the shaft 142. The shaft 142 has an elongated oil spring 178 surrounding it to increase the stability of the shaft and to act as a spacer between the shaft and the interior of the cartridge. The shaft 142 has an O-ring groove 180 on its outer periphery with an O-ring 182 mounted therein to provide a seal between the shaft 142 and the cartridge.

The cartridge 70 is drivingly supported on the shaft 142 to rotate with the shaft as the electric motor rotates the shaft. The cartridge includes a base 184 which has a central aperture 186 contained therein, and the cartridge shaft extends through the aperture so that the base rests on the aforementioned cartridge rest. A cartridge seal 188 is mounted in the aperture 186 and is fixed to the base 184. The cartridge seal includes a conical sleeve 190 for sealingly engaging the O-ring 182. A flange 192 is formed integral with the sleeve and is sealingly fixed to the base 184. An interior perforated tube 194 is fixed to the base 184. Fixed to the upper end of the tube 194 is a solid cartridge top 196. Near the outer periphery of the tube 196, a perforated fiber drum 198 is positioned in sealing engagement with the cartridge top and the base 184. Positioned around the outer periphery of the drum is a plurality of identical filter tubes 200. Each of the tubes 200 has the same construction as each other tube and filter tube extends vertically from the base 184 to the top 196. Each tube has its outer surface formed by a cylindrical tube of screen 202. The interior of each cylindrical tube of screen 202 is filled with an adsorbent material 204. The adsorbent material is a mixture of activated granular carbon and sawdust having proportions of, one-third sawdust and two-thirds activated carbon by weight. The sawdust is white pine having a size between 40 and 50 mesh. Each of the tubes is positioned in a recess 206 in the base and a ring 208 having a plurality of apertures 210 for receiving the tubes is sealingly fixed to the top 196; thus, the tubes are held in position relative to the top and base. The outermost surface of the cartridge is a cotton fabric filter cloth 212 which assumes a serpentine configuration as it follows the outer periphery of the tubes, as may be best seen in FIGURE 7. It may be appreciated that the serpentine configuration of the filter cloth gives an added area to the filter cloth.

The space between the drum 198 and the interior tube 194 is filled by a plurality of concentric tubes of felt with an adsorbent material between the felt tubes. An outermost felt tube 214 is positioned in engagement with the interior of fiber perforated drum 198. A second felt tube 216 is concentric with, spaced from and positioned within the felt tube 214. A third felt tube 218 is concentric with the felt tube 214 and is spaced from and positioned within the felt tube 216 as is a fourth felt tube 220, which is also spaced from tube 216. A fifth felt tube 222 is also concentric within the felt tube 214 and is spaced from and positioned with tube 220. An innermost felt tube 224 is concentric with the felt tube 214 and is in engagement with the exterior surface of the perforated interior tube 104. The bottoms of all of the tubes are sealed closed and connected by a felt bottom 226, and the tops of felt tubes are sealed closed and connected by a felt top 228. The space between felt tubes are filled by an adsorbent material 229 which is identical in its composition to the adsorbent material 204.

As was mentioned above, the cartridge is drivingly connected to the cartridge shaft 142. The top 196 has an elongated drive plate 230 welded thereto which plate fits into the slotted drive plug 174 so that the cartridge rotates wtih the shaft. In order to maintain the cartridge in position in engageemnt with the cartridge shaft, a U-shaped retainer 232 is welded to the interior of top 86 and is spaced slightly from top 196 to prevent the cartridge from being lifted out of engagement with the drive shaft during normal operation of the apparatus. The top 196 has a pair of handles 234 on its upper surface to provide a convenient means for lifting the cartridge out of the cartridge container 68.

In order to provide a means for draining the cartridge container, an outlet pipe 236 is connected to the interior tank 94 as may be best seen in FIGURE 4. The outlet pipe 236 is connected to a discharge pipe 238 through a valve 240. The discharge pipe 238 is connected to the drain 76 through a valve 242. An inlet pipe 244 is connected to the upper end of the interior tank, and a valve 246 controls the flow from the pipe 244 to outlet pipe 236. The inlet 244 is connected to a valve 248 which is connected to a source of compressed air for reasons which will become apparent hereinafter.

Dry cleaning solvent which has perchlorethylene is purified by an improved method in that the solvent is placed under pressure by a conventional pump which is not shown in the instant drawings. The solvent is forced through the delinter 12. Lint is removed and the solvent is forced into the interior tank 94 and then the solvent is sprayed through the nozzles 102, 104, 106, 108, 110 and 112. The solvent knocks off dirt particles from the outer periphery of cartridge 70, and then the solvent passes into the cartridge and dirt particles are removed and any organic impurities are removed by the adsorbent materials. The solvent is then recovered in the interior of the cartridge and returned to the dry cleaning machine.

Considering now the detailed operation of the apparatus discussed above, it may be seen that used dry cleaning solvent is delivered to the delinter 12 through pipe 20, after the pressure has been suitably raised by a conventional pump. The solvent enters the tank 22 through pipe 20 near the upper portion of the tank. The solvent flows down into the lint trap 54. All of the solvent passes through the nylon bag 62 and out through the perforations in basket 54 to leave the tank through pipe 16. It should be noted that the lint bag traps particles having a diameter greater than 5 thousandths of an inch; thus, the lint trap collects the large particles of lint which are collected by used dry cleaning solvent. From the delinter, the dry cleaning solvent flows to the filter 14.

The dry cleaning solvent enters the interior tank 94 through the pipe 16. The pressure in the tank 94 is approximately 50 p.s.i. so that the solvent is forced out of the nozzles and impinges upon the cartridge 70. It may be appreciated that as the solvent passes through the cartridge 70, dirt having a size greater than 5 microns is trapped on the outside surface of the cartridge; that is, the cotton fabric filter cloth 212 excludes those particles. As was mentioned above, the cartridge is rotated by the drive 18, and it is rotated at one and one-half revolutions per minute in a counter-clockwise direction when viewed from the top. As the cartridge rotates, the top nozzle, that is nozzle 102, first causes solvent under pressure to strike a selected area of the cartridge and any dirt which adheres to the outside surface is knocked off and falls down or is forced downward so that the next nozzle 104 then directs a stream of solvent under pressure toward the fabric to either knock off the dirt or force it downward. It may be appreciated that this action continues with each of the succeeding nozzles, as was mentioned above. The nozzles are arranged in a line defined as a helix so that the dirt is eventually forced to the bottom of the outside surface. As the dirt falls down it engages the deflector 116 and eventually falls to the dirt basket 120 where the dirt particles are trapped and held. It should be noted at this point that though a series of nozzles are provided, the instant method discussed herein may be accomplished by providing a series of nozzles completely encircling the outside surface of the cartridge to force down the dirt which collects on the outside surface of the cartridge without moving the cartridge, or the cartridge may be alternately rotated in opposite directions in order to produce relative motion between the outside surface of the cartridge and the body of dry cleaning solution just outside the outside surface thereby knocking off the dirt which clings on the outside surface of the cartridge.

It should be noted that the surface of the cartridge is increased substantially by virtue of the serpentine configuration of the filter cloth 212 being positioned around the tubes 200. Once the dry cleaning solvent passes the filter cloth, it may pass through one or more of the tubes 200 so that any organic impurities in the solvent are removed from it by adsorption. The activated carbon in conjunction with the sawdust removes the impurities from the solvent. The solvent then passes through the fiber drum 110 and through the outermost felt tube 214. The solvent next passes through more adsorbent material and through another felt tube, then alternating through felt and adsorbent material until it passes through the perforated interior tube 194. The felt serves to remove any particles having a size greater than 2 microns and the adsorbent materials, of course, remove organic impurities. It should be noted that by providing the alternate felt and adsorbent material compositions there is less opportunity for erosion paths or channels to be formed in the adsorbent material; thus, the solvent must pass through the cartridge in a uniform manner and the cartridge has a longer effective life.

After the solvent passes through the perforated interior tube 194, it is collected and returned to the dry cleaning machine for subsequent use. The cleaned dry cleaning solvent is collected in the hollow cartridge shaft 142 through inlet apertures 172. It may be seen that the cartridge is sealed onto the shaft so that the purified solvent must flow down hollow shaft. The liquid then flows out of the discharge apertures 170 into the collector sleeve 138. The pipe 156 then returns the solvent to the dry cleaning machine where the dry cleaning solution is reused.

The instant apparatus is cleaned by first of all draining the tanks. The valve 28 is opened after the valve 21 is closed. The fluid is drained out of the tank after valve 158 is also closed. The valves 240 and 242 are opened and valve 248 is opened to allow compressed air to be forced into the interior tank to blow out the tank. Electric motor 162 is speeded up in order to spin the cartridge faster in order to expel any solvent which may be held in the cartridge. The compressed air is shut off and the tops 34 and 86 are then removed. Lint trap 54 is removed by lifting handle 60 to lift the basket 56. The bag 62 is then removed and cleaned to dispose of the lint. It is readily apparent that when needed, nylon bag 62 may be replaced. The cartridge 70 is removed by lifting the cartridge by handles 234. Next, the dirt basket 120 is lifted out of the tank and the dirt which has collected is discarded. The basket is then replaced and the cartridge 70 is placed into position. It should be noted that the cartridge is slipped down shaft 142 until the conical sleeve 190 engages the O-ring 182. The weight of the cartridge forces the cartridge down and thus holds the conical sleeve in sealing engagement with the O-ring 182. The elongated plate 230 is positioned in the drive plug 174 so that the cartridge is drivingly connected to the shaft. The tops are replaced on the respective tanks after the cleaning operation and the apparatus again is ready for use.

Although the instant method and apparatus has been discussed in term of dry cleaning solvent, it may be used with other liquids though the method and apparatus are particularly well adapted for use with dry cleaning solvents, in view of the peculiar problems encountered in purifying dry cleaning solvents. It is readily apparent that those skilled in the art may make various modifications and changes in both the apparatus and method discussed herein without departing from the spirit and scope of the instant invention. It is to be expressedly understood that the present invention is limited only by the appended claims.

What is claimed is:

1. An apparatus of the character described comprising, in combination, a tank, a lint trap positioned in said tank for collecting and holding lint particles, a second tank connected to the first mentioned tank, said second tank having a plurality of nozzles mounted therein, said nozzles being ararnged in a substantially helical path, a cartridge rotatably mounted in said second tank and having its outer periphery adjacent to said nozzles, said cartridge including means for filtering out dirt particles and for adsorbing impurities from a liquid passing through the cartridge, and a drive connected to said cartridge rotating the cartridge in the tank past the nozzles, whereby the rotation o fthe cartridge past the nozzles causes a spray of a liquid from said nozzles to disengage dirt particles adhering to the outer periphery of the cartridge.

2. A cartridge for purifying a dry cleaning solvent comprising, in combination, a base, a plurality of elongated tubes mounted on said base adjacent to the outer periphery thereof, a filter fabric positioned in engagement with the elongated tubes to form the outer surface of the cartridge, a preforated sleeve mounted at the center of said base, a plurality of substantially concentric felt tubes mounted on said base within a closed figure defined by said plurality of elongated tubes, and an adsorbent material filling the space between said felt tubes.

3. A cartridge for purifying a dry cleaning solvent comprising, in combination, an annular base, a perforated sleeve mounted on the center of said base and being substantially perpendicular thereto, a top fixed to said sleeve, a plurality of elongated tubes extending from the base to the top and being positioned adjacent to the outer periphery of the base, each of said tubes having a perforated outer surface and being filled with an adsorbent material, a filter material in engagement with the tubes forming a serpentine outermost surface of the cartridge, a plurality of substantially concentric felt tubes extending from the base to the top and positioned between the aforementioned tubes and the perforated sleeve, an adsorbent material filling the space between the felt tubes, and a tapered sleeve connected to the base and extending toward the top to provide a portion of a seal for said cartridge.

4. In an apparatus of the character described, a filter comprising, in combination, a tank, an interior tank within said tank, a plurality of nozzles mounted on said interior tank defining a portion of a helix, a hollow cartridge shaft rotatably mounted in said tank, a base removably supported on said cartridge shaft, a conical sleeve sealingly connected to the base in the central portion thereof, an O-ring positioned between the shaft and the conical sleeve to provide a seal therebetween, a perforated sleeve fixed to to said base and surrounding a portion of the shaft, a solid top fixed to the perforated sleeve, a plurality of elongated tubes extending from the base to the top adjacent to the outer periphery of said base, a filter material engaging the elongated tubes forming a serpentine outer surface, a plurality of felt tubes extending from the base to the top and being positioned between the perforated sleeve and the aforementioned tubes and being substantially concentric with the perforated sleeve, an adsorbent material filling the space between the felt tubes, a drive plug fixed to the hollow shaft, a drive plate fixed to the top and mating with the drive plug to provide a means for drivingly connecting the shaft with the top, said hollow shaft having a plurality of inlet apertures adjacent to the perforated sleeve, a collector sleeve mounted in said tank and surrounding a portion of the hollow shaft, said hollow shaft having a plurality of discharge apertures adjacent to the collector sleeve, a dirt collector positioned below the base, and a drive connected to the hollow shaft, whereby the drive rotates the shaft to rotate the top and the filter material past the nozzles which spray a liquid therefrom to impinge upon the filter material to knock off foreign particles which collect on the outer surface, and the foreign particles are collected in the collector below the base; and the liquid passing through the filter material the felt tubes and the adsorbent material is purified thereby.

References Cited by the Examiner

UNITED STATES PATENTS

| | | | |
|---|---|---|---|
| 1,516,702 | 11/1924 | Berry | 210—325 |
| 2,189,458 | 2/1940 | Carrier et al. | |
| 3,042,214 | 7/1962 | Arvanitakis | 210—330 X |
| 3,107,217 | 10/1963 | Muller | 210—409 X |
| 3,132,501 | 5/1964 | Jacobs et al. | 210—315 X |
| 3,145,170 | 8/1964 | Baldwin et al. | 210—457 X |
| 3,190,449 | 6/1965 | Muller | 210—334 X |
| 3,199,679 | 8/1965 | Salyer | 210—24 X |
| 3,201,346 | 8/1965 | Benedict | 210—24 |

FOREIGN PATENTS 452,907  11/1948  Canada.

MORRIS O. WOLK, *Primary Examiner.*

MICHAEL E. ROGERS, *Examiner.*